No. 671,673. Patented Apr. 9, 1901.
W. L. JUDSON.
VARIABLE SPEED REVERSING DRIVE FOR AUTOMOBILES.
(Application filed Nov. 6, 1899.)
(No Model.) 7 Sheets—Sheet 2.

Witnesses,
Harry Algor
F. D. Merchant

Inventor,
Whitcomb L. Judson
By his Attorney,
Jas. F. Williamson

No. 671,673. Patented Apr. 9, 1901.
W. L. JUDSON.
VARIABLE SPEED REVERSING DRIVE FOR AUTOMOBILES.
(Application filed Nov. 6, 1899.)
(No Model.) 7 Sheets—Sheet 3.

Witnesses
Harry Kilgore
F. D. Merchant

Inventor:
Whitcomb L. Judson
By his Attorney,
Jas. F. Williamson

No. 671,673. Patented Apr. 9, 1901.
W. L. JUDSON.
VARIABLE SPEED REVERSING DRIVE FOR AUTOMOBILES.
(Application filed Nov. 6, 1899.)
(No Model.) 7 Sheets—Sheet 4.

Witnesses.
Harry Kilgore,
F. D. Merchant.

Inventor,
Whitcomb L. Judson,
By his Attorney,
Jas. F. Williamson

No. 671,673. Patented Apr. 9, 1901.
W. L. JUDSON.
VARIABLE SPEED REVERSING DRIVE FOR AUTOMOBILES.
(Application filed Nov. 6, 1899.)
(No Model.) 7 Sheets—Sheet 5.
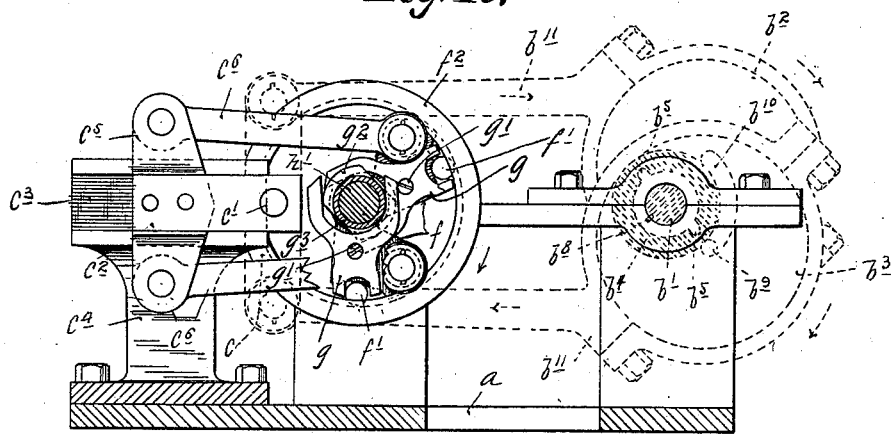
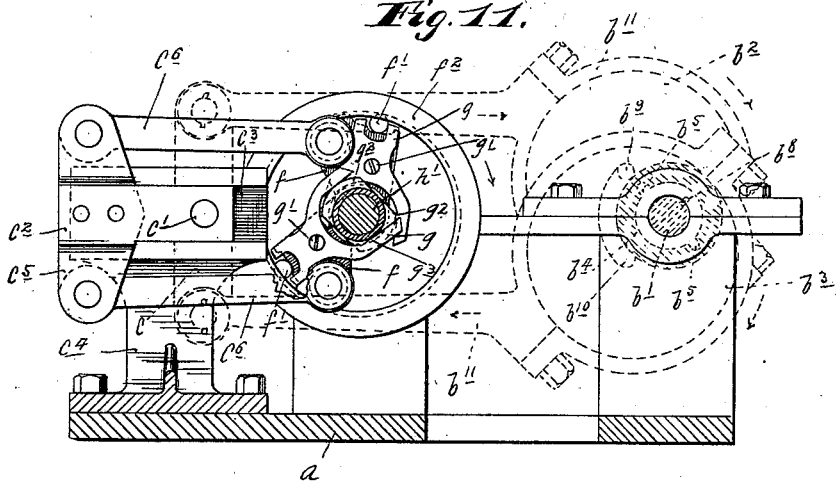

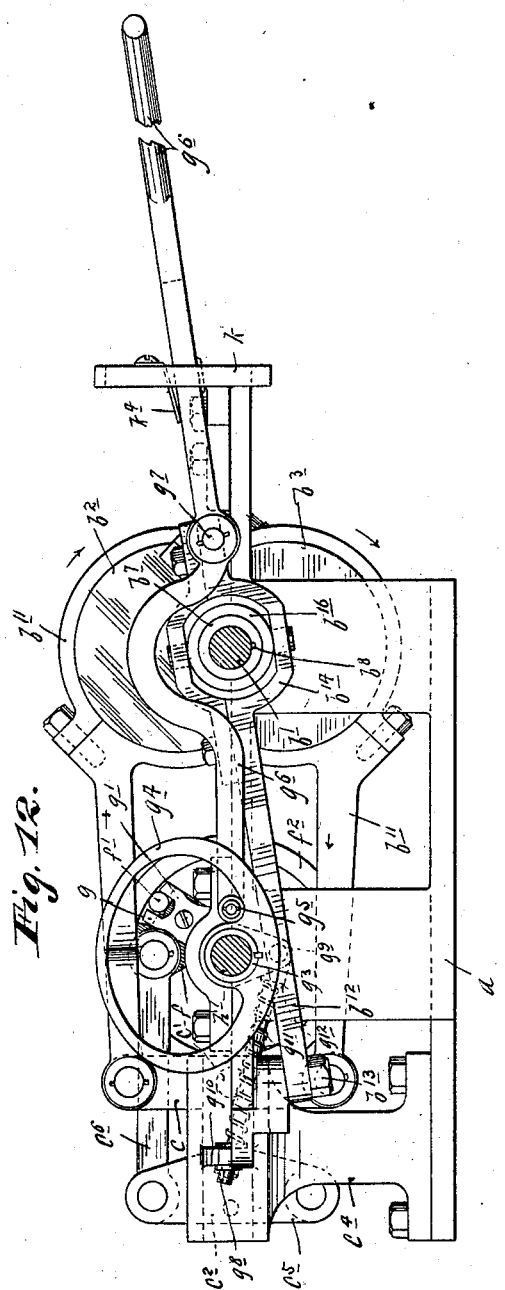

No. 671,673. Patented Apr. 9, 1901.
W. L. JUDSON.
VARIABLE SPEED REVERSING DRIVE FOR AUTOMOBILES.
(Application filed Nov. 6, 1899.)
(No Model.) 7 Sheets—Sheet 7.
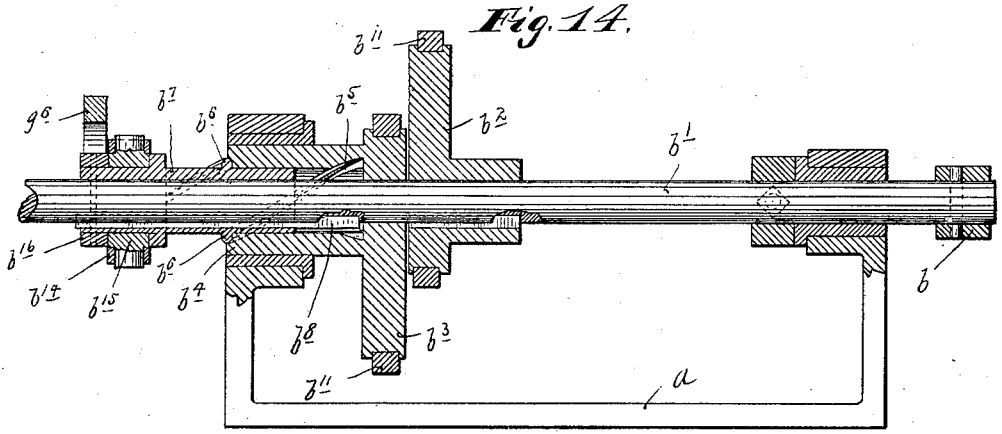
Witnesses,
Harry Kilgore,
F. D. Merchant
Inventor.
Whitcomb L. Judson,
By his Attorney,
Jas. F. Williamson
THE NORRIS PETERS CO., PHOTO-LITHO., WASHINGTON, D. C.

UNITED STATES PATENT OFFICE.

WHITCOMB L. JUDSON, OF CHICAGO, ILLINOIS.

VARIABLE-SPEED REVERSING-DRIVE FOR AUTOMOBILES.

SPECIFICATION forming part of Letters Patent No. 671,673, dated April 9, 1901.

Application filed November 6, 1899. Serial No. 735,921. (No model.)

*To all whom it may concern:*

Be it known that I, WHITCOMB L. JUDSON, a citizen of the United States, residing at Chicago, in the county of Cook and State of Illinois, have invented certain new and useful Improvements in Variable-Speed Reversing-Drives for Automobiles and other Uses; and I do hereby declare the following to be a full, clear, and exact description of the invention, such as will enable others skilled in the art to which it appertains to make and use the same.

My invention has for its object to provide an improved power-transmitting mechanism.

To this end my invention consists of the novel devices and combinations of devices, which will be hereinafter described, and defined in the claims.

The invention was especially designed for use on automobiles, with a view of meeting the peculiar conditions desired in the service from such vehicles; but it will be understood, of course, that the invention is capable of general application for transmitting power wherever the corresponding functions are desired.

The invention is illustrated in the accompanying drawings, wherein like notations refer to like parts throughout the several views.

Figure 1:
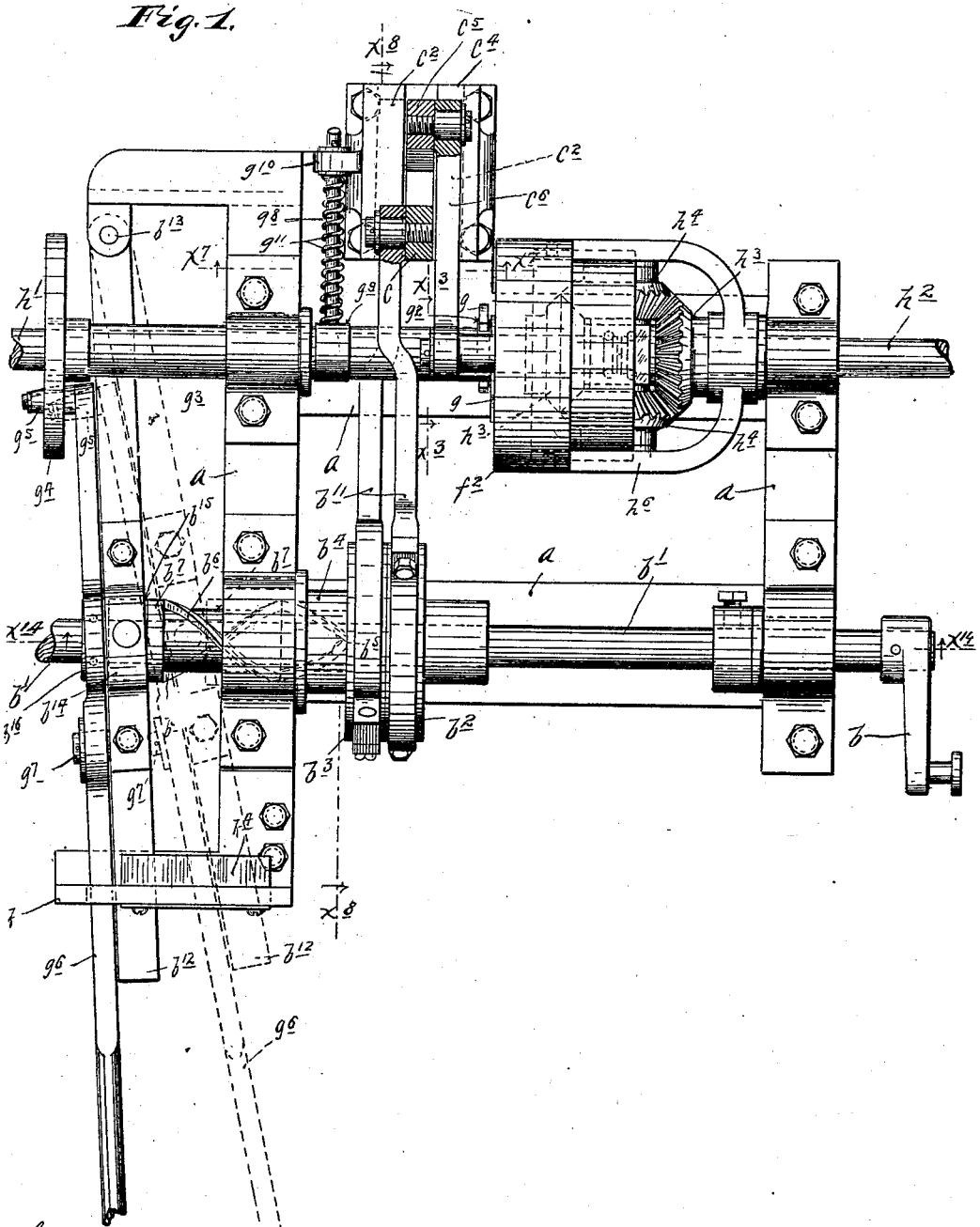
Figure 2:
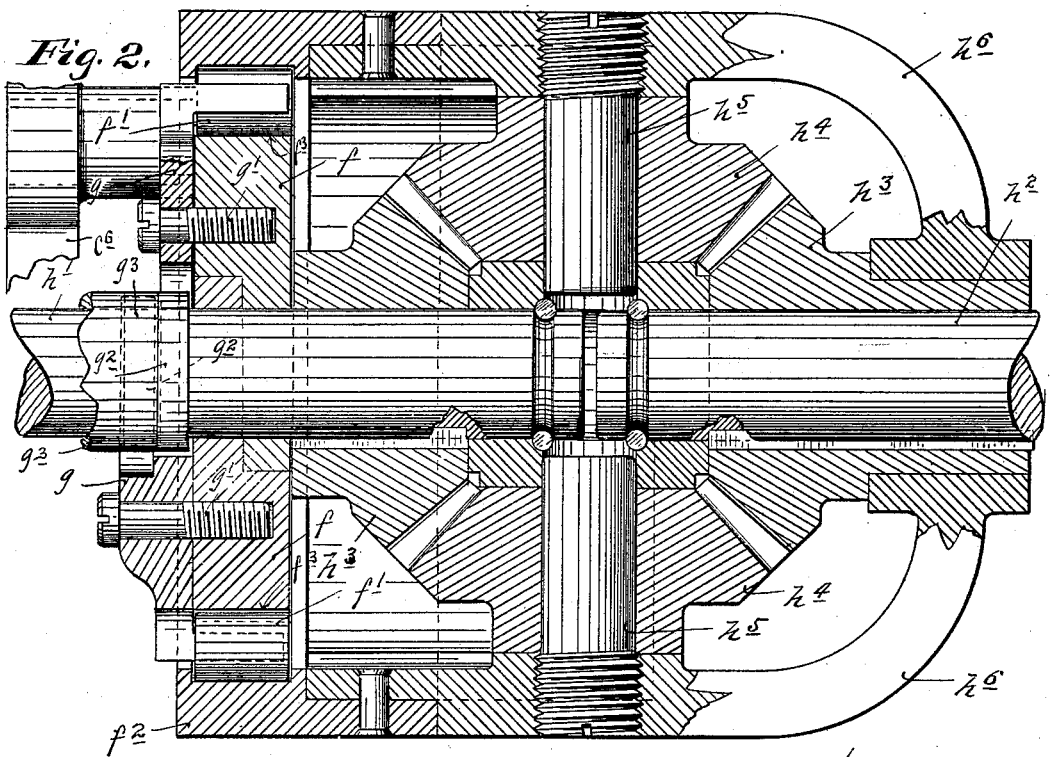
Figure 3:
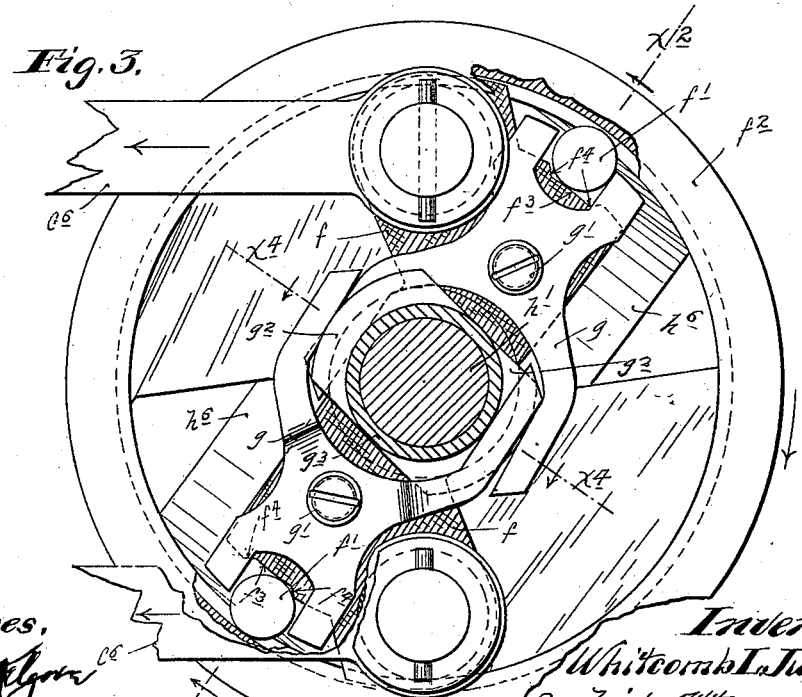
Figure 4:
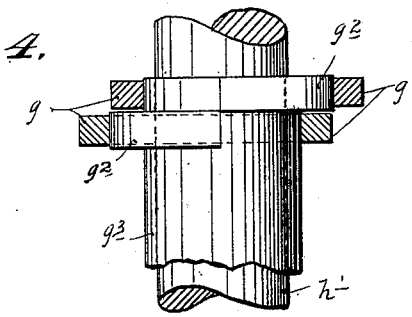
Figure 5:
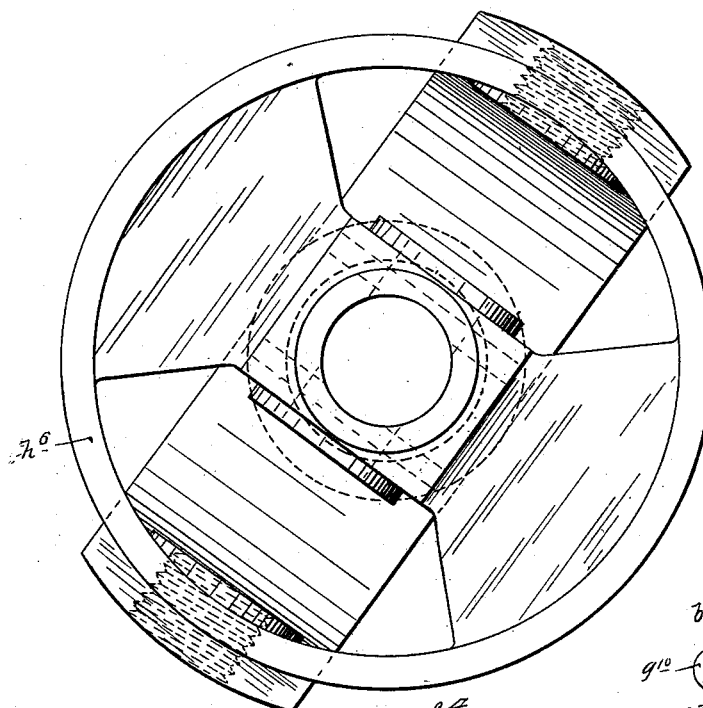
Figure 6:
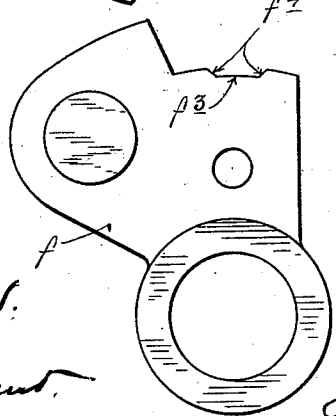
Figure 7:
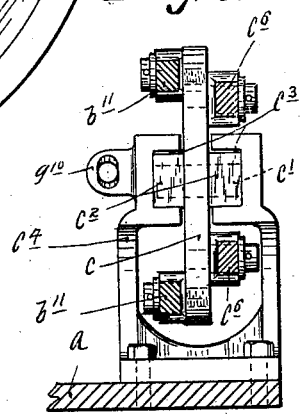
Figure 8:
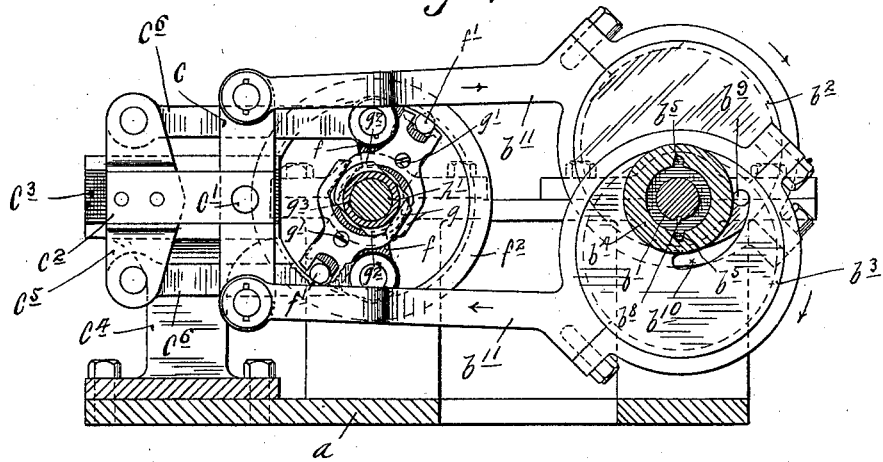
Figure 9:
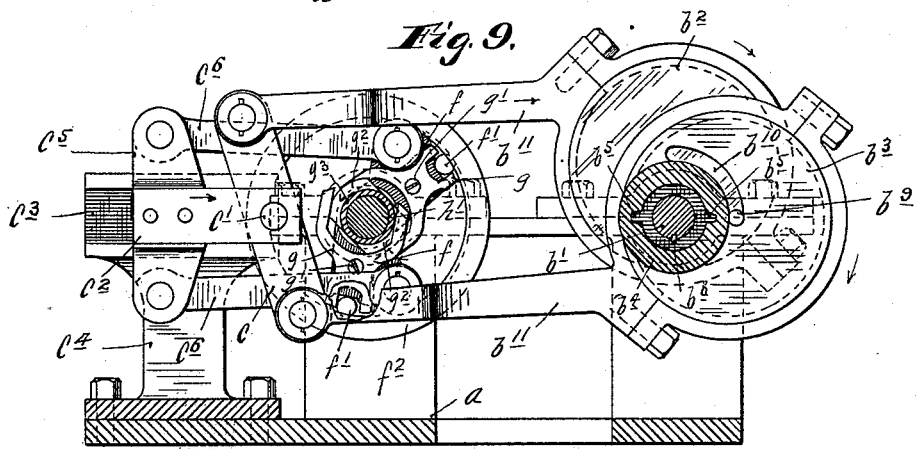

Figure 1 is a plan view, with some parts broken away, illustrating my mechanism. Fig. 2 is a section on the line $x^2 x^2$ of Fig. 3. Fig. 3 is a section on the line $x^3 x^3$ of Fig. 1. Fig. 4 is a detail in section on the line $x^4 x^4$ of Fig. 3. Fig. 5 is a detail in end elevation looking at the open end of the differential-gear casing or spider, with the friction-ring and the gears removed. Fig. 6 is a detail of one of the roller-driving rockers detached and shown in plan view. Fig. 7 is a view looking at the cross-head and its guides on the line $x^7 x^7$ of Fig. 1. Fig. 8 is a vertical section on the line $x^8 x^8$ of Fig. 1, with the parts in the same position as in Fig. 1—to wit, with the eccentrics of the driving-shaft in their neutral or stop-action position with respect to motion on the driven shaft. Fig. 9 is a view on the same section-line as Fig. 8 and showing the same parts as in Fig. 8, but with the parts shown in the position which they would assume when the adjustable eccentric has been set in respect to the fixed eccentric on the driving-shaft so as to impart the maximum travel to the cross-head under the rotary motion of said eccentrics on the driving-shaft. Fig. 10 is a view on the same section-line as Figs. 8 and 9, partly in diagram and with some parts broken away, showing the same elements as in said Figs. 8 and 9, but with the parts shown in the position which they would take at the innermost limit of the cross-head's travel, assuming the eccentrics to have been set relative to each other, as shown in Fig. 9. Fig. Fig. 11 is a view similar to Fig. 10, but showing the same parts as they would appear at the opposite or outermost limit of the cross-head's travel. Fig. 12 is a view chiefly in left-end elevation with respect to Fig. 1, but with some parts shown in section and others broken away to illustrate the speed controlling and reversing devices. Fig. 13 is a similar view showing the same parts, or some thereof, as they would appear when the reverse is being made. Fig. 14 is a detail in section on the line $x^{14} x^{14}$ of Fig. 1, showing the relations of the eccentrics to each other, to the driving-shaft, &c. Fig. 15 is a detail in plan view, showing the relation of the adjustable eccentric and its hub to the shifting-collar which carries the same. Fig. 16 is a detail showing the spring and its guide-rod, which coöperate with the hand-lever for manipulating the reversing-cam. Fig. 17 is a detail in end elevation, showing the guide for the hand or controlling lever.

In a suitable framework $a$ is mounted in suitable bearings a main or driving shaft $b'$, which receives rotary motion in a continuous direction from any suitable source applied in any suitable way, as by a crank $b$ on the shaft $b'$. This driving-shaft $b'$ is provided with a pair of eccentrics $b^2 b^3$, of which the member $b^2$ is keyed or otherwise fixed to the shaft and the member $b^3$ is adjustable thereon. As shown, the eccentric $b^3$ is provided with a hub $b^4$, formed integral with the eccentric and having spiral grooves $b^5$, which engage with spiral splines $b^6$, formed on the periphery of a shifting-collar $b^7$, as best shown in Fig. 15, and this shifting-collar $b^7$ is carried by the shaft $b'$ and connected thereto by the key or feather $b^8$ with freedom for sliding motion thereon. Hence by sliding the shifting-collar $b^7$ lengthwise of the shaft $b'$ the adjustable eccentric $b^3$ may be given an angular motion on the shaft $b'$ for bringing the same to any desired adjustment within the predetermined limit with respect to the fixed eccentric $b^2$. The said eccentrics $b^2$ and $b^3$ are side by side, and the member $b^2$ is provided with a pin $b^9$, which works within the curved slot $b^{10}$, formed in the other or adjustable eccentric $b^3$. This pin-and-slot connection between the two eccentrics determines the limit of the adjustment in either direction. The said eccentrics $b^2$ and $b^3$ are provided with suitable straps and rods, the straps and rods being shown as formed integral with each other and are marked with the single reference-letter $b^{11}$. Said eccentric-rods $b^{11}$ are shown as pivotally connected to the opposite ends of an equalizing-lever $c$, which is shown as pivotally connected at its center by pivot-pin $c'$ to a pair of cross-head slides $c^2$. The lever $c$ is between the slides $c^2$ of the cross-head, and said slides $c^2$ are mounted to travel in suitable guides $c^3$, formed in a bracket-pedestal $c^4$, rising from the main frame. At their outer ends the cross-head slides $c^2$ are rigidly connected to a cross-bar $c^5$. The cross-bar $c^5$ has pivotally attached to its opposite ends a pair of links $c^6$, which links at their opposite ends are pivotally connected to a pair of driving-rockers $f$, which form parts of a friction-roller clutch for imparting rotary motion to the vehicle-axle or other driven shaft. The driven shaft, as shown, is a divided shaft made up of the two sections $h'$ $h^2$, mounted in suitable bearings fixed to the main framework $a$. The two sections of the divided shaft are connected by a differential gearing, which, as shown, is made up of four beveled gears, two members of which (marked $h^3$) are fixed one to each of the shaft-sections and the other two members of which gears (marked $h^4$) are carried on radial shafts $h^5$, fixed to the gear-casing $h^6$. The gear-casing $h^6$ is in the form of a spider, which is loosely mounted on the sections of the divided shaft, and hence when rotary motion is applied to this spider or gear-casing the shaft-sections $h'$ and $h^2$ will be driven thereby through the beveled gears $h^3$ $h^4$ with freedom for a differential motion of one section in respect to the other. This differential or compensating gear therefore permits one section of the axle or divided shaft to stand still while the other turns or the two sections to turn in opposite directions, as required to meet the conditions when a pivotal motion is given to the front truck of the vehicle in the horizontal plane, as when turning corners, rounding curves, and various other motions. The casing or spider $h^6$ of the compensating gear is provided with a friction band or ring $f^2$, rigidly secured thereto for coöperation with the friction-rollers $f'$, carried by the driving-rockers $f$, hitherto noted as the coöperating members of a friction-roller clutch. The driving-rockers $f$ are pivoted directly on the shaft-section $h'$, both being rabbeted or reduced at their lower ends for engagement with each other and the embracing of the shaft, while permitting the rockers to be in the same radial plane. The said driving-rockers $f$ are of the proper construction at their upper or outer ends to afford seats $f^3$ for the rollers $f'$ and to afford a pair of cam-action or biting surfaces $f^4$ at the opposite limits of said roller-seats $f^3$ for coöperation with the rollers $f'$ and the ring $f^2$ to impart motion to the ring in opposite directions, according to which members of said pairs of biting-surfaces $f^4$ are brought into action under the rocking motion of the rockers $f$. These driving-rockers $f$ are so arranged that one thereof will force its roller into working engagement with the friction-ring at the same time that the other releases its roller from the friction-ring.

A pair of roller-shifters $g$ are pivoted to the driving-rockers, each by a pin $g'$. These roller-shifters $g$ are forked at both ends. The upper or outer forks loosely embrace the friction-rollers $f'$ and the inner or lower forks embrace a corresponding pair of reversing-cams $g^2$, which are formed on the inner end of a sleeve $g^3$, which is mounted on the shaft-section $h'$ and carries at its outer end a cam-ring $g^4$. The cam-ring $g^4$ is subject to the action of a hand-lever and a spring for shifting the same, as required, to effect the reverse. As shown best in Figs. 12 and 13, the cam-ring $g^4$ is engaged by a roller $g^5$, carried at the lower end of a hand-lever section $g^6$, which is pivoted to another lever-section $b^{12}$, as shown at $g^6$. The lever-section $b^{12}$ therefore serves as a fulcrum or base of resistance for the pivotal motion of the lever $g^6$. Hence by pulling up on the lever-section $g^6$ the cam $g^4$ may be thrown from the position shown in Fig. 12 into the position shown in Fig. 13, for example. A rod $g^8$ is pivotally connected to a crank-lug $g^9$, which is fixed to the cam-sleeve $g^3$. At its outer or free end the rod $g^8$ works through a suitable guide $g^{10}$, projecting from the pedestal $c^4$. A coiled spring $g^{11}$ surrounds the rod $g^8$ and reacts between the shoulder $g^{12}$ of the rod and the guide $g^{10}$ for the rod. When the cam-ring $g^4$ is thrown from the position shown in Fig. 12 into the position shown in Fig. 13, for example, the spring $g^{11}$ will be compressed. The throw imparted to the cam-ring $g^4$ under the action of the lever-section $g^6$ is sufficient to carry the crank-lug $g^9$ past the dead-center, thereby rendering the spring $g^{11}$ operative to continue the movement of the cam-ring $g^4$ to complete the shift required to effect the reverse. When the cam-ring $g^4$ is thus shifted from one of its set positions to the other, the cams $g^2$ at the inner end of the sleeve $g^3$ will also be shifted on the shaft-section $h'$, and thereby the roller-shifters $g$ will be rocked on their pivot-pins $g'$ to an opposite extreme position and will carry with them the rollers $f'$, thereby bringing the rollers into proper position for coöperation with the opposite members of the biting-surfaces $f^4$ on the driving-rockers $f$. Hence under the rocking motion of said drivers the bite between the rollers and the friction-ring will come in the opposite travels or throws of said rockers as compared with the original positions. Otherwise stated, the rocker which pulled will now push and the rocker which pushed will now pull. The motion on the friction-ring will therefore be reversed and through the compensating gear the corresponding reverse motion will be imparted to the sections $h'$ $h^2$ of the driven shaft.

The lever-section $b^{12}$ is pivoted at its lower or innermost end to the main frame, as shown at $b^{13}$, for pivotal motion in the horizontal plane. Said lever-section $b^{12}$ is provided with a suitable yoke $b^{14}$, which engages the trunnions of a shipper-collar $b^{15}$. The shipper-collar $b^{15}$ is loosely mounted between the collars $b^{16}$ of the shifter sleeve or collar $b^7$, which works in the hub of the adjustable eccentric. Hence by moving the lever-section $b^{12}$ in the horizontal plane the shifting collar or sleeve $b^7$ may be moved lengthwise of the driving-shaft $b'$ for shifting the adjustable eccentric as may be desired to vary the speed or to bring the parts of the variable drive to the neutral or stop-motion position.

The two levers or lever-sections $g^6$ and $b^{12}$ are pivotally connected, as described, at $g^7$ for manipulation with one hand, and the power ends of said levers work in a guide $k$, having a horizontal guideway $k'$ and a vertical guideway $k^2$. This guide $k$ is fixed to the main frame in any suitable way, and the parts are so related that when the lever $b^{12}$ is at the outward limit of its pivotal motion it cannot leave the horizontal section $k'$ of the guide, but will rest thereon as the base of resistance. At this same time the reversing-lever $g^6$ will be in position for its pivotal movement within the vertical section $k^2$ of the guide. Hence with this construction and arrangement of the controlling devices for the variable-speed reversing-drive it is obvious that the reverse cannot be made without first bringing the parts of the drive into their neutral or stop-action position. The horizontal section $k'$ of the guide $k$ may be provided with notches $k^3$ for engagement with the lever-section $g^6$ to hold the lever at any desired point of its possible adjustment, thereby fixing the speed of the driven shaft relative to the driving-shaft. As shown, the guide $k$ has attached thereto a spring $k^4$, tending to hold the lever $g^6$ in its set position within the retaining-notch engaged thereby.

All the different parts have now been specified, and the actions of the same are probably clear from the detailed description. A summary statement of the general operation may, however, be of advantage.

It must be obvious that by the use of the equalizing-lever $c$ for connecting the two eccentric-rods to the cross-head the cross-head will be made to travel at a uniform rate, notwithstanding the differences in the rates of travel of the eccentric straps and rods in the different parts of the path traversed by the eccentrics under the rotary motion of the driving-shaft $b'$. Hence whenever the eccentrics are set to impart any reciprocating motion to the cross-head the cross-head through the connections therefrom to the driving-rockers of the friction-clutch will impart strokes of uniform length to the said rockers. Otherwise stated, the driving action will be uniform at any given speed for which the eccentrics may have been set. This of course is a matter of large importance for securing a steady motion on the axle or driven shaft. For such uses as an automobile a steady motion on the driven axle is of prime importance in order to avoid the bucking effect which would otherwise be produced on the riders or other load carried by the vehicle.

The advantages of the friction-clutch and the means for reversing the motion imparted thereby to the driven shaft have already been fully pointed out. A reversing-drive is of course a necessity from a practical point of view for the commercial use of an automobile.

The advantage of arranging the controlling devices for this variable speed and reversing drive in such a manner that the reverse cannot be made without first bringing the parts of the drive to their neutral or stop-motion position must be apparent. Without such a provision accidents are almost inevitable with the use of automobiles in crowded thoroughfares. If the reverse or the shift to effect the reverse could be suddenly made, so as to throw the parts from one extreme position to the other, the strain on the moving parts from momentum would be so great as to be destructive, and the violent jar given to the riders might be extremely injurious. In this same connection the provision herein disclosed, whereby the speed in either direction may be varied through all degrees from zero up to the maximum speed, is also of the highest importance for the use of automobiles in crowded thoroughfares. Where only two or three speeds are available, it may often be impossible to accommodate the motion of the automobile to the surrounding vehicles. It may be impossible to stop without being jammed or run over. It may be impossible to go slow enough to avoid jamming the vehicle in advance. With the device as herein disclosed the speed may be varied or the vehicle stopped, as required, to suit any emergency in either direction of travel, and the reverse or stop if made must be made in a manner to avoid violent jar to the riders or violent strain upon the elements of the drive.

The mechanism as an entirety has the further merit of simplicity and compactness, considering the function required.

In practice all the mechanism would of course be inclosed in a dust-proof housing.

It will be further understood that the details of the construction might be varied in many respects without departing from the spirit of my invention.

What I claim, and desire to secure by Letters Patent of the United States, is as follows:

1. The combination with a rotary shaft having a pair of eccentrics fixed against lateral movements, but rotatively adjustable in respect to each other, and movable to and from points of eccentricity diametrically opposite on the circle of rotation, of corresponding eccentric straps and rods, a cross-head and guides and an equalizing-lever pivoted to the cross-head and pivotally connected to the respective eccentric-rods at points on opposite sides of its cross-head pivot, whereby the cross-head may be made to reciprocate at a uniform rate of travel and the extent of its travel may be varied at will, substantially as described.

2. The combination with a rotary shaft, of a pair of eccentrics thereon, one of which is fixed to the said shaft and the other of which is provided with a hub having spiral grooves, a slidable collar having spiral splines engaging the spiral grooves of said eccentric, which collar is carried by the said shaft and splined thereto with freedom for sliding motion thereon, whereby the said eccentrics may be rotated by shifting said collar, to effect the desired adjustments of the two eccentrics with respect to each other.

3. In a variable-speed driving mechanism the combination with a rotary shaft, of a pair of eccentrics arranged thereon side by side fixed against lateral movements and having pin-and-slot connections with each other, one of which eccentrics is fixed to the shaft and the other of which is rotatively adjustable thereon within the limits permitted by said slot-and-pin connection, substantially as described.

4. The combination with a rotary shaft, of a pair of eccentrics thereon side by side, and having pin-and-slot connections with each other, one of which eccentrics is fixed to said shaft and the other of which eccentrics is provided with a hub having spiral grooves, and a shiftable collar keyed for sliding movements on said shaft and provided with spiral splines engaging the spiral grooves of the said eccentrics, substantially as described.

5. The combination with a main or driving shaft turning in a constant direction and a divided or sectional counter-shaft, of a variable-speed drive for transmitting motion to said counter-shaft, from said main or driving shaft, which drive includes a pair of eccentrics on the driving-shaft adjustable in respect to each other, a cross-head and guides, an equalizer connecting the two eccentric-rods to the cross-head, a friction-clutch receiving motion from said cross-head and a compensating gear driven by said clutch and driving said divided or sectional counter-shaft, substantially as described.

6. The combination with a main or driving shaft, turning in a constant direction and a divided or sectional counter-shaft, of a variable-speed reversing-drive for transmitting motion from said main shaft to said counter-shaft, which drive includes a pair of eccentrics on the driving-shaft, adjustable in respect to each other, a cross-head and guides, an equalizer connecting the two eccentric-rods to the cross-head, a friction-clutch receiving motion from said cross-head and constructed to permit the motion of its driven member to be reversed, at will, and a compensating gear receiving motion from said friction-clutch and driving said divided or sectional counter-shaft, substantially as described.

7. The combination with the driving-shaft turning in a constant direction and the divided or sectional counter-shaft, of the pair of eccentrics on the driving-shaft, one of which is angularly adjustable in respect to the other, the corresponding eccentric straps and rods, the cross-head and guides, the equalizing-lever pivoted to said cross-head and having its outer end portions pivotally connected one end to each of said eccentric-rods, the friction-roller clutch having its driving-rockers connected by links to the rigid cross-bar of said cross-head, the roller-shifters and devices for controlling the shifting of the same to reverse the motion on the driven member of the clutch, and the compensating gear provided on its spider or casing with the ring member of said friction-clutch, and taking hold of the stud or radial cross-shafts of the gear for driving the sections of the divided shaft, substantially as and for the purposes set forth.

8. A power-transmission device, comprising a variable speed and reversible drive, permitting the speed of the driven member to be varied at will, and in either direction of travel, a speed-controller and a reversing device for said drive, and a device permitting the movement of said reversing device only when said speed-controller is in a neutral or stop-motion position, substantially as described.

9. A power-transmission device, comprising a variable and reversible drive permitting the speed of the driven member to be varied at will and in either direction of travel, a controller for said drive, and a guide or guides for said controller permitting the same to be moved at will to vary the speed of the driving motion, but permitting said controller to be moved to reverse the driving motion only when the said controller is in a neutral position, or in a position in which the drive will not transmit motion.

In testimony whereof I affix my signature in presence of two witnesses.

WHITCOMB L. JUDSON.

Witnesses:
MABEL M. McGRORY,
JAS. F. WILLIAMSON.